United States Patent
Duan et al.

(10) Patent No.: US 7,692,888 B2
(45) Date of Patent: Apr. 6, 2010

(54) APPARATUS, SYSTEM, AND METHOD FOR DETECTION OF FLY HEIGHT MARGIN USING CONTROLLED EXCITATION OF AIR BEARING MODE

(75) Inventors: Shanlin Duan, Fremont, CA (US); Jizhong He, San Jose, CA (US); John Stephen Hopkins, Gilroy, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 578 days.

(21) Appl. No.: 11/609,811

(22) Filed: Dec. 12, 2006

(65) Prior Publication Data

US 2008/0137225 A1  Jun. 12, 2008

(51) Int. Cl.
*G11B 21/02* (2006.01)

(52) U.S. Cl. ........................... 360/75; 360/294.7
(58) Field of Classification Search ................ None
See application file for complete search history.

(56) References Cited

U.S. PATENT DOCUMENTS

| | | | | |
|---|---|---|---|---|
| 5,880,587 | A | 3/1999 | Annis et al. | 324/212 |
| 6,105,421 | A | 8/2000 | Yao et al. | 73/105 |
| 6,142,006 | A | 11/2000 | Marchon et al. | 73/1.81 |
| 6,293,135 | B1 | 9/2001 | Marchon et al. | 73/1.89 |
| 6,404,504 | B2 | 6/2002 | Liu et al. | 356/507 |
| 6,568,252 | B1 | 5/2003 | Boutaghou | 73/104 |
| 6,757,124 | B2 * | 6/2004 | Kelemen | 360/75 |
| 6,785,079 | B2 | 8/2004 | Brannon et al. | 360/75 |
| 6,785,081 | B2 | 8/2004 | Chapin et al. | 360/75 |
| 2003/0193750 | A1 * | 10/2003 | Kohira et al. | 360/236.3 |
| 2004/0240099 | A1 | 12/2004 | Brannon et al. | 360/75 |

FOREIGN PATENT DOCUMENTS

| | | |
|---|---|---|
| JP | 62058471 | 3/1987 |
| JP | 62141632 | 6/1987 |
| JP | 11265557 | 9/1999 |
| JP | 2001043649 | 2/2001 |
| JP | 2003308670 | 10/2003 |
| JP | 2003308670 A * | 10/2003 |

* cited by examiner

*Primary Examiner*—Jason C Olson
(74) *Attorney, Agent, or Firm*—Kunzler Needham Massay & Thorpe

(57) ABSTRACT

An apparatus, system, and method are disclosed for fly height detection. The apparatus includes an actuator configured to induce vibrations in a glide head that is configured to detect physical asperities on a disk surface. The apparatus may also include a second end of the suspension arm coupled with the glide head and a sensor module that is configured to communicate with a control module in response to the glide head coming in contact with at least one physical asperity. The system includes the apparatus, a disk having a surface comprising physical asperities, and a head gimbal assembly configured to calibrate a fly height margin for the disk. The method includes inducing vibrations in a glide head, detecting physical asperities on a disk surface, and communicating with a control module in response to the glide head coming in contact with at least one physical asperity.

27 Claims, 6 Drawing Sheets

APPARATUS, SYSTEM, AND METHOD FOR DETECTION OF FLY HEIGHT MARGIN USING CONTROLLED EXCITATION OF AIR BEARING MODE

BACKGROUND OF THE INVENTION

1. Field of the Invention

The invention relates to physical asperity testing of disk drive systems. More specifically, the present invention relates to manners of detecting a fly height margin using controlled excitation of air bearing modes.

2. Description of the Related Art

Computer systems generally utilize auxiliary storage devices onto which data can be written and from which data can be read for later use. A direct access storage device is a common auxiliary storage device which incorporates rotating magnetic disks for storing data in magnetic form on concentric, radially spaced tracks on the disk surfaces. Transducer heads driven in a path generally perpendicular to the drive axis are used to write data to the disks and to read data from the disks.

Many aspects of development and manufacturing in the disk drive industry are involved in the effort to produce the most reliable direct access storage device possible while maintaining a reasonable price. These efforts include design, component selection, development tests, and manufacturing tests. Once produced, disks are generally submitted to a variety of manufacturing tests. For instance, a series of testing operations are typically carried out on each disk. These operations may be conducted at a common station, or the disk may be transported to different stations to perform the specified operation.

One such operation involves conditioning the disk surface. The conditioning involves abrasive objects wiping or dragging across the surface of the disk. The purpose of this operation is to remove any residue or physical asperities. A further operation is a touchdown height test. The touchdown height is the height of a flying head sensor over the surface of a disk at which the head first begins to contact asperities. The touchdown height may be measured with the use of a test head gimbal assembly (HGA) flying above the disk. In manufacturing, a fly height margin is designated and defined to be a safe operating height of above the highest asperity on the disk. To determine the fly height margin, a speed sensitive HGA is used to gauge the height of the asperities on the disk surface. The actual touchdown height of the HGA is critical for determining a fly height margin.

The disk drive industry has been engaged in an ongoing effort to increase the densities of hard disk drives. The ultrahigh densities have allowed the disk drive industry to continually miniaturize disk drives. A common problem inherent to ultrahigh densities is the fly height of the read/write head. As the density is increased, the fly height margin of the read/write head must be reduced. If the fly height margin is substantially greater than the ideal fly height, the read/write head's capability to accurately and reliably read and write data will be diminished. Thus, the fly height margin becomes an important measurement of the quality of the disk.

Glide or fly height margin testing detects the asperities and other abnormalities that are detrimental to the performance and reliability of the disk drive. Typically, a glide height calibration apparatus includes a disk, an HGA, and a calibrated asperity. The HGA is velocity sensitive, or in other terms, the fly height of the HGA is dependent on the linear velocity of the disk. Currently, in order to determine the fly height the velocity of the disk is reduced until the slider attached at the end of the HGA makes contact with the calibrated asperity.

Once the slider contacts the calibrated asperity, a small piezoelectric ceramic crystal (not shown) detects the vibration caused by the impact. When contact is made between the calibrated asperity and the slider of the HGA, the impact is translated from a vibration caused by the impact into an electrical signal by the piezoelectric ceramic. At that point the fly height is calibrated to the height of the calibrated asperity.

Several problems have arisen from calibrating the glide height in the manufacturing process. One problem associated with the glide test is the inability to measure the fly height accurately due to inadequate measurement tool accuracy and repeatability. One current process includes multiple optical fly height measurements and repeated adjustment of parts to meet the optimal fly height specification. One of the adjustments is a mechanical adjustment of the suspension of the HGA. This form of adjustment consequently can cause damage and yield fallout. Additionally, certain components can become unstable after adjustment and begin to creep back to their original mechanical state.

Other problems that current fly height tests suffer from include fly height variation due to slider wear during calibration and measurement, and instability in the surface due to lube change. Furthermore, the manufacturing time required to perform measurement and adjustment processes can be extensive, and the yield fallout due to the handling and the adjustment is costly. The resulting variation of fly height can be very large. With such a large variation, the calibration of the glide height results in significant yield fallout and adds to the uncertainty of the actual fly height.

Thus, it can be seen from the above discussion that there is a need existing in the art for an improved fly height adjustment and calibration method and apparatus.

SUMMARY OF THE INVENTION

The present invention has been developed in response to the present state of the art, and in particular, in response to the problems and needs in the art that have not yet been fully solved by currently available fly height detection systems. Accordingly, the present invention has been developed to provide an apparatus, system, and method for detection of fly height using controlled excitation of air bearing mode that overcome many or all of the above-discussed shortcomings in the art.

The apparatus to detect fly height is provided with a plurality of modules configured to functionally execute the steps of fly height detection. These modules in the described embodiments include an actuator coupled with a first end of a suspension arm and configured to induce vibrations in a glide head. The glide head is configured to detect physical asperities on a disk surface. The glide head may be coupled with a second end of the suspension arm. The apparatus may also include a sensor module configured to communicate with a control module in response to the glide head coming in contact with at least one physical asperity.

In one embodiment, the apparatus also includes a touchdown height detector configured to measure the amplitude of vibration of the glide head. The touchdown height detector may comprise a laser Doppler velocimeter, a laser Doppler vibrometer, or the like. In a further embodiment, the actuator is configured to increase the amplitude of vibration of the glide head until the glide head contacts at least one physical asperity.

The sensor module, in a further embodiment, may control a vibration sensor that comprises a piezoelectric sensor configured to transmit an electrical signal to the sensor module in response to glide head contact with a physical asperity. The actuator may comprise an acoustic emission sensor. Furthermore, the control module may be configured to calibrate the vibration of the glide head by inducing a vibration in the glide head, measuring the vibration of the glide head, and correlating the vibration with a drive level.

A system of the present invention is also presented for detection of fly height using controlled excitation of the air bearing mode. In particular, the system, in one embodiment, includes a disk configured to record data, the disk having a surface comprising physical asperities, and a head gimbal assembly configured to calibrate a fly height margin for the disk. In one embodiment, the head gimbal assembly comprises a glide head coupled to a suspension arm, and an actuator coupled with a first end of the suspension arm and configured to induce vibrations in the glide head.

Additionally, the glide head may be configured to detect physical asperities on the disk surface. The system also includes a sensor module configured to communicate with a control module in response to the glide head coming in contact with at least one physical asperity. The system may include all of the elements of the above described apparatus.

A method of the present invention is also presented for fly height detection. The method in the disclosed embodiments substantially includes the steps necessary to carry out the functions presented above with respect to the operation of the described apparatus and system. In one embodiment, the method includes inducing vibrations in a glide head, detecting physical asperities on a disk surface, and communicating with a control module in response to the glide head coming in contact with at least one physical asperity.

The method may also include measuring the amplitude of vibration of the glide head, and increasing the amplitude of vibration of the glide head until the glide head contacts at least one physical asperity. In one embodiment, the method comprises controlling a vibration sensor, and transmitting an electrical signal to the sensor module in response to glide head contact with a physical asperity.

The method, in one embodiment, may include calibrating the vibration of the glide head by inducing a vibration in the glide head, measuring the vibration of the glide head, and correlating the vibration with a drive level.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
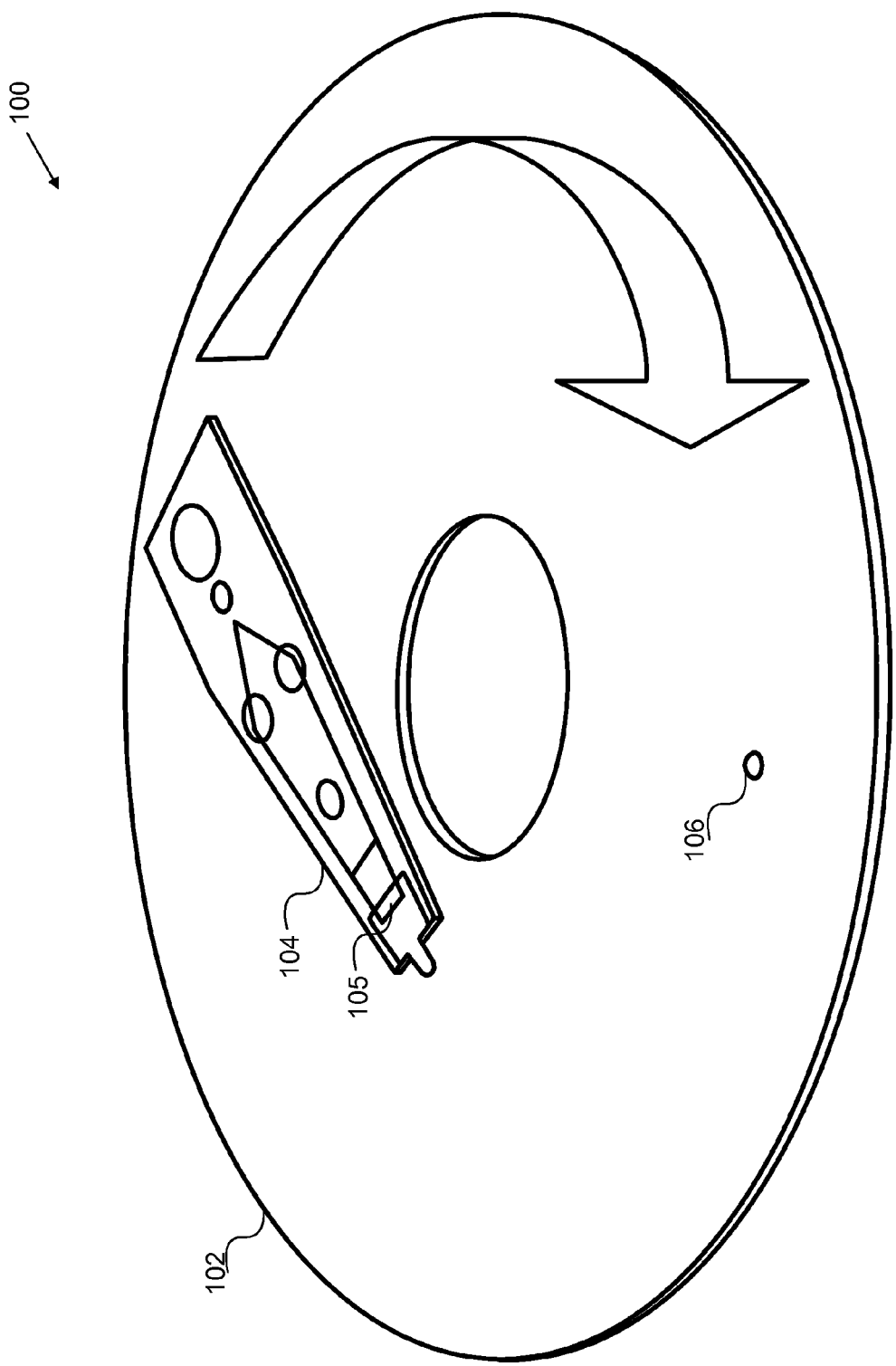
FIG. 1 is a schematic representation of a glide height calibration test apparatus of the prior art.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer usable medium may take any form capable of generating a signal, causing a signal to be generated, or causing execution of a program of machine-readable instructions on a digital processing apparatus. A computer usable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic representation of a glide height calibration test apparatus 100 of the prior art. Shown therein is a disk 102, a head gimbal assembly (HGA) 104, and an asperity 106. As used herein, the term "asperity" refers to a small projection from a surface. In other terms, an asperity 106 may comprise a bump extending from a surface of the disk 102. Additionally, the term asperity may refer to any abnormality on the surface of the disk 102, including, but not limited to, raised and lowered or wavy portions of the disk 102.

The HGA 104 is velocity sensitive, or in other terms, the fly height of HGA 104 is dependent on the linear velocity of the disk 102. As used herein, the term "fly height" refers to the distance between the HGA 104 and the surface of a perfect disk 104. However, imperfections or asperities are nearly impossible to avoid during the manufacturing process and therefore manufacturers define a second height referred to as a "fly height margin." As used herein, the term "fly height margin" refers to the distance between the HGA 104 and an average height of the asperities.

In order to determine the fly height, the velocity of the disk is reduced until the slider attached at the end of the HGA 104 makes contact with the asperity 106. In one embodiment, the asperity 106 is calibrated to a predetermined size. A small piezoelectric ceramic crystal 105 is coupled to the slider. When contact is made between the calibrated asperity 106 and the slider of the HGA 104, the contact is translated into an electrical signal by the piezoelectric ceramic 105, and the signal is transmitted to a controlling device (not shown). At that point the fly height is calibrated to the height of the calibrated asperity 106. This is the height at which the glide height is set for the tested disk.

Figure 2:
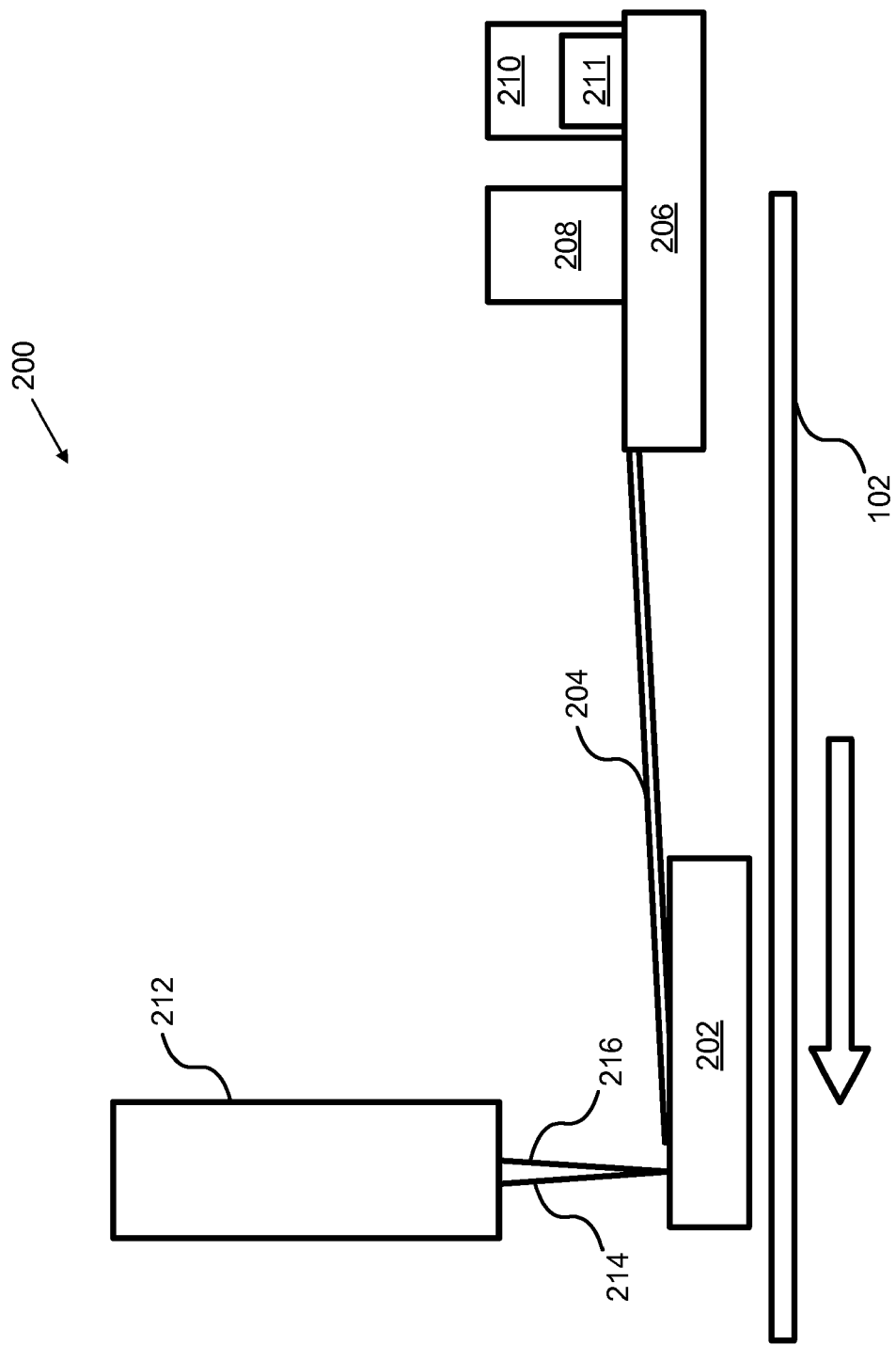
FIG. 2 is a schematic block diagram illustrating one embodiment of a system for fly height detection using controlled excitation of an air bearing mode in accordance with the present invention.

FIG. 2 is a schematic block diagram illustrating one embodiment of a system 200 for fly height detection using controlled excitation of an air bearing mode. The term "air bearing" refers to a bearing that is literally formed of air. The air bearing is formed between a glide head 202 or slider and the surface of the disk 102. The air bearing is effective in the depicted embodiment because the gap between the glide head 202 and the disk 102 is small and the differential velocity is of a magnitude that allows the viscosity of air to build up enough pressure to maintain a gap between the glide head 202 and the disk 102.

The system 200 also includes a suspension arm 204 coupling the glide head 202 with a suspension holder 206. The suspension holder 206 may be coupled to a housing (not shown) and is configured to support an actuator 208 and a sensor module 210. In one embodiment, the system 200 also includes a touchdown height detector 212.

The actuator 208 is configured to induce vibrations in the glide head 202. One example of an actuator 208 suitable for use in the present invention includes, but is not limited to, an acoustic emission (AE) sensor. An AE sensor works by releasing energy in the form of an acoustic or ultrasonic energy wave when a material undergoes deformation. The AE sensor may be configured to emit energy at a frequency selected to increase the natural vibration of the glide head 202.

The actuator 208 is configured to incrementally increase the amplitude of vibration of the glide head 202 until the glide head contacts the surface of the disk 102. Alternatively, a physical connection between the actuator 208 and the glide head 202 may transfer the energy of the actuator to the glide head 202 in order to induce or increase vibration in the glide head 202. Examples of such a system include, but are not limited to PZT transducers, oscillating crystals, and the like.

In one embodiment, the sensor module 210 is coupled with a vibration sensor 211 configured to detect a collision between the glide head 202 and the physical asperity 106. The vibration sensor 211 may also be configured to translate the mechanical movement caused by the collision into an electrical signal that is subsequently communicated with the sensor module 210. For example, a collision or contact between the glide head 202 and the physical asperity 106 will cause movement that travels through the suspension arm 204 to the suspension holder 206. The vibration sensor 211 is configured to detect the movement and translate the mechanical energy into an electrical signal.

The vibration sensor 211, in one embodiment, comprises a device capable of translating movement into an electrical signal, such as, but not limited to, materials that demonstrate a piezoelectric effect. Alternatively, the vibration sensor 211 may comprise optic sensors configured to detect minute displacement of the suspension holder 206.

The touchdown height detector 212, in one embodiment, is configured to measure the amplitude of vibration of the glide head 202. As used herein, the term "touchdown height" refers to the distance between the glide head 202 and the tallest asperity, or in other terms the distance between the disk 102 and the point at which the glide head 202 first begins to contact asperities.

One example of a touchdown height detector 212 suitable for use in the present invention is a laser Doppler velocimeter. The laser Doppler velocimeter (LDV) is configured to direct a monochromatic laser beam 214 toward the glide head 202 and subsequently collect the reflected radiation 216. The change in wavelength, according to the Doppler Effect, depends on the amplitude of vibration of the glide head 202. In this manner the amplitude of vibration of the glide head 202 may be determined and subsequently the touchdown height may also be determined.

Figure 3A:
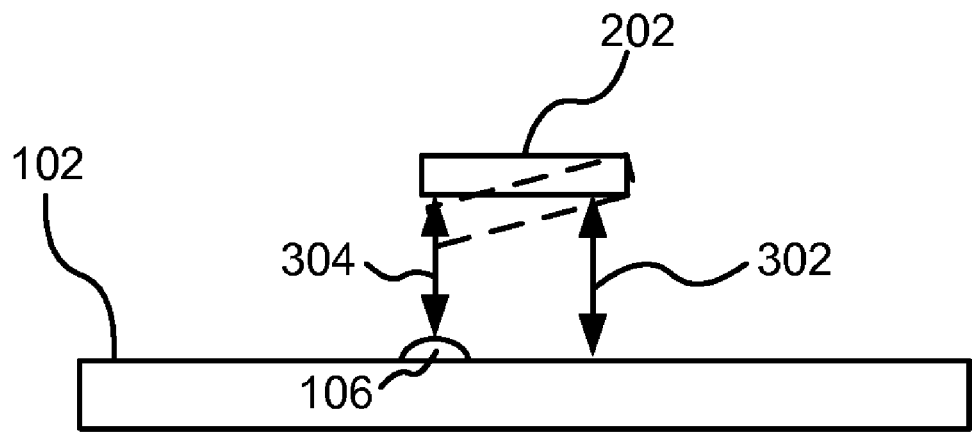
FIG. 3a is a schematic block diagram illustrating one embodiment of fly height of a glide head in accordance with the present invention.

FIG. 3a is a schematic block diagram illustrating one embodiment of fly height of a glide head 202 in accordance with the present invention. The glide head 202, as described above, may be coupled with the suspension assembly. However, for clarity the suspension assembly is not depicted in FIGS. 3a and 3b. In one embodiment, the fly height 302 is the distance between the center rail trailing edge (CRTE) of the glide head 202 and the surface of the disk 102. Alternatively, the fly height is the distance between any point of the glide head 202 and the disk 102 surface.

In one embodiment, the glide head 202 may fly above the disk 102 surface at a fly height 302 of 10 nanometers. Multiple asperities 106 may be found on the surface of the disk, each asperity 106 having a different size, for example, 2, 5, and 6 nanometers. The fly height margin 304 is the distance between the glide head 202 and the average height of the asperities. In other terms, the fly height margin 304 is essentially the distance the glide head 202 may be lowered from the fly height without contacting the tallest asperity 106.

Figure 3B:
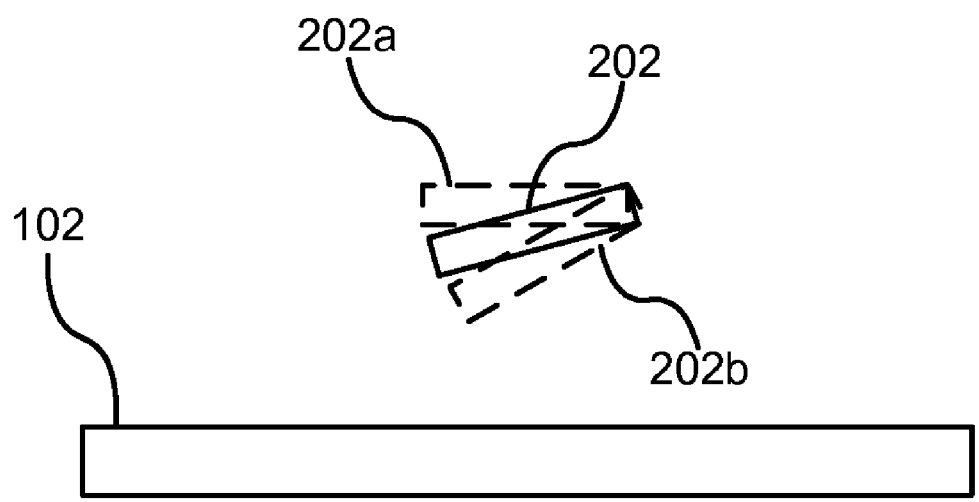
FIG. 3b is a schematic block diagram illustrating an alternative embodiment of the glide head in accordance with the present invention.

FIG. 3b is a schematic block diagram illustrating an alternative embodiment of the glide head 202 in accordance with the present invention. As described above, the actuator 208 is configured to induce vibrations in the glide head 202. The induced vibrations may be manifested in a manner similar to the flapping wings of a bird, as illustrated in FIG. 3b (referring to the hatched lines 202a, 202b of the glide head 202).

The actuator 208 is configured to increase the vibrations of the glide head 202 subsequently increasing the up and down motion of the glide head 202 until the glide head 202 comes in contact with either the disk 102 surface or an asperity 106. In one embodiment, increasing the vibrations in the glide head 202 increases the "flapping" of the glide head 202.

Figure 4:
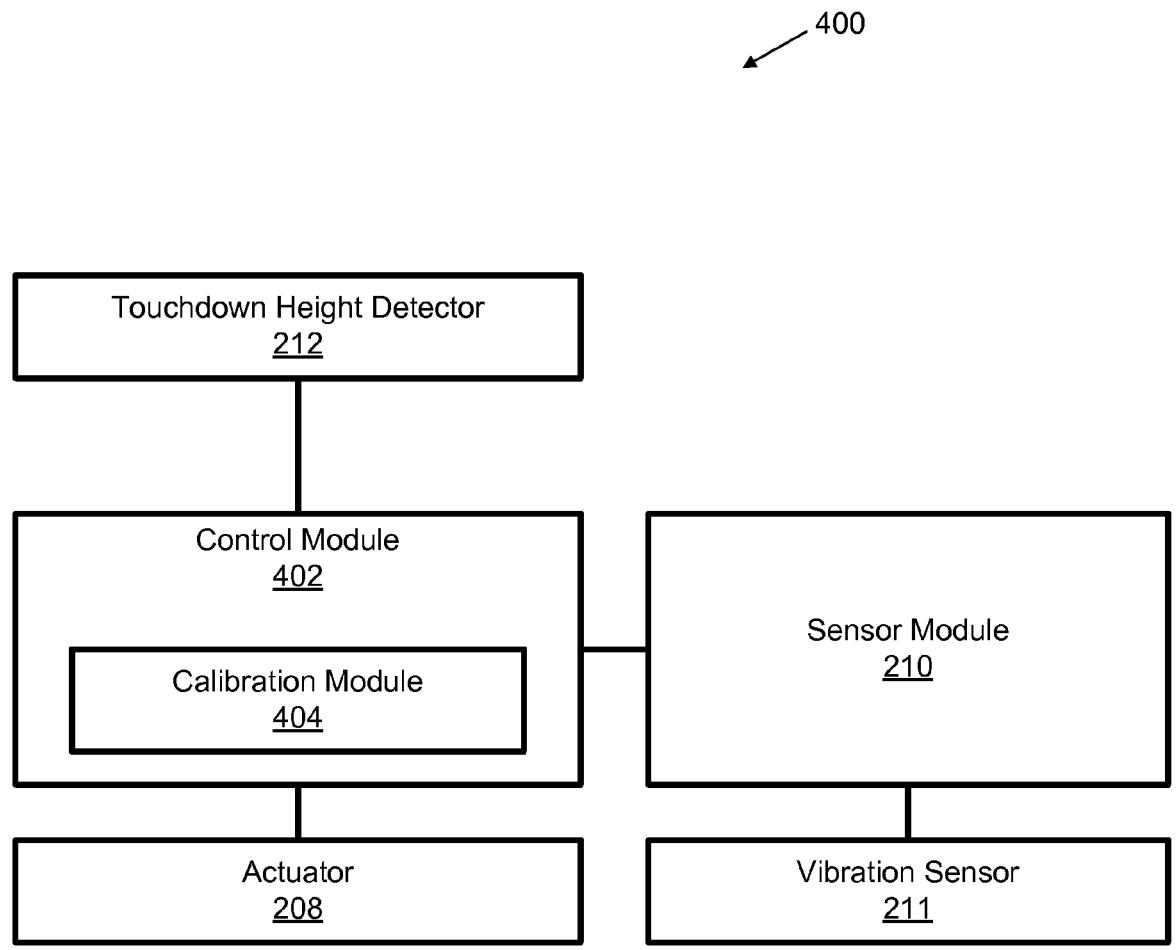
FIG. 4 is a schematic block diagram illustrating one embodiment of a control system for fly height detection in accordance with the present invention.

FIG. 4 is a schematic block diagram illustrating one embodiment of a control system 400 for fly height detection in accordance with the present invention. In one embodiment, the control system 400 comprises a control module 402 coupled with the sensor module 210 and the actuator 208. The control module is configured to communicate with the sensor module 210 and receive a notification of a collision event from the vibration sensor 211 by way of the sensor module 210.

In the depicted embodiment the sensor module 210 is illustrated as an entity separate from the vibration sensor 211. Alternatively, the sensor control capabilities of the sensor module 210 may be integral to the vibration sensor 211. The control module 402 is further configured to command the actuator 208 to increase the vibration in the glide head 202 until a collision is detected by the vibration sensor 211. In a further embodiment, the control module 402 includes a calibration module 404 configured to calibrate the vibration of the glide head 202 by inducing a vibration in the glide head 202 and measuring the vibration of the glide head 202. The calibration module 404 is also configured to correlate the vibration with a drive level The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
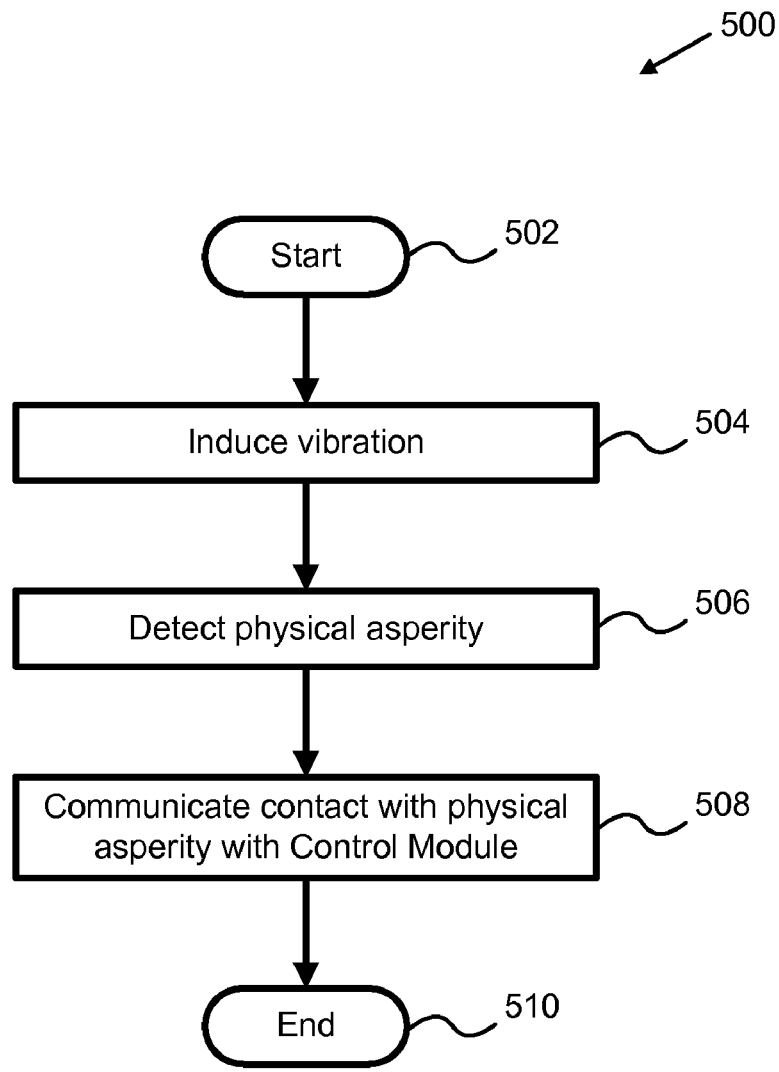
FIG. 5 is a schematic flow chart diagram illustrating one embodiment of a method for fly height detection using controlled excitation of the air bearing mode in accordance with the present invention.

FIG. 5 is a schematic flow chart diagram illustrating one embodiment of a method 500 for touchdown height detection using controlled excitation of the air bearing mode in accordance with the present invention. The method 500 starts 502 and the control module 402 commands the actuator 208 to induce 504 a vibration in the glide head 202. The vibration sensor 211 then detects 506 a physical asperity 106 and the sensor module 210 communicates 508 the contact or collision with the control module 402. The method 500 then ends 510.

Figure 6:
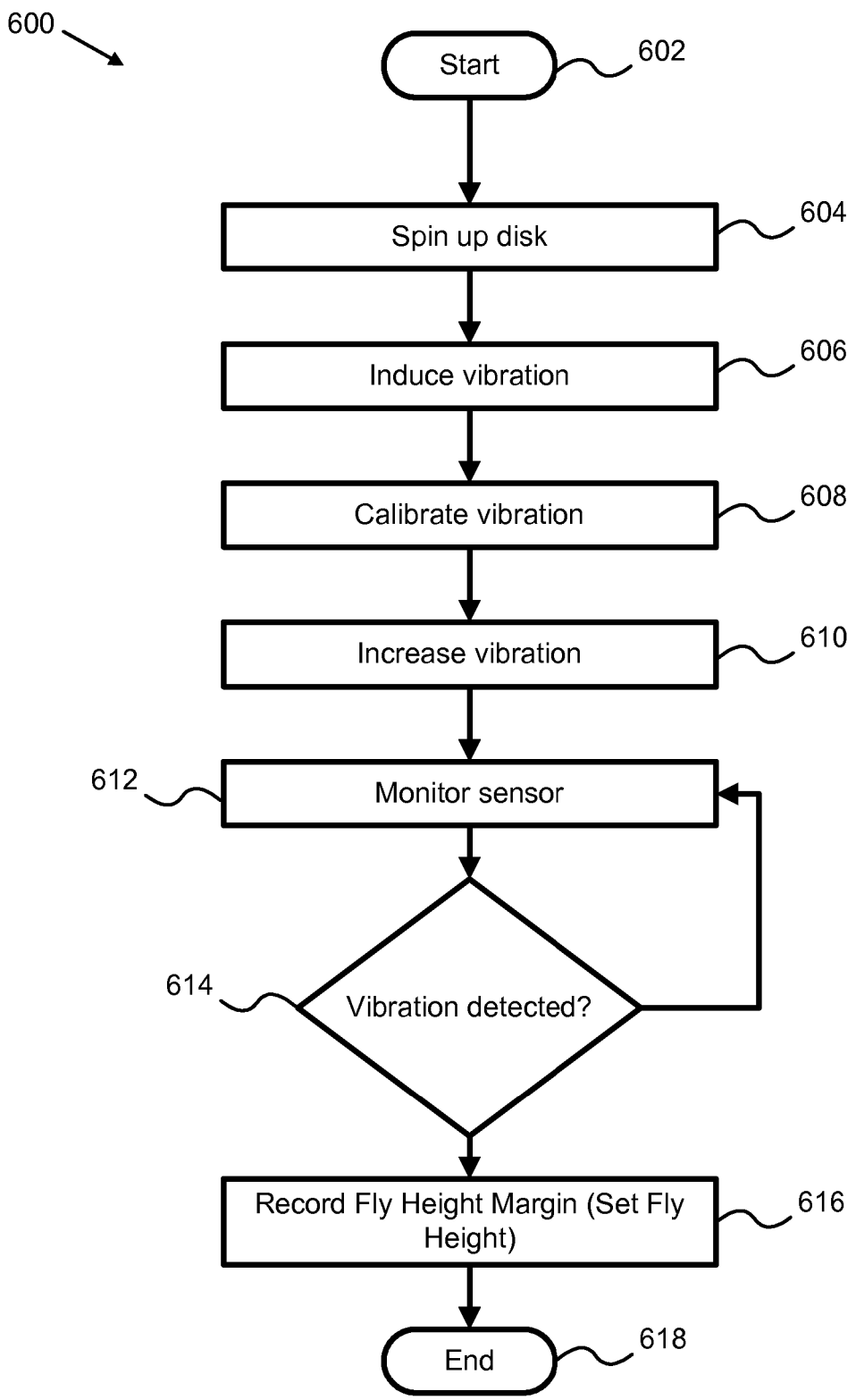
FIG. 6 is a schematic flow chart diagram illustrating an alternative embodiment of a method for fly height detection using controlled excitation of the air bearing mode in accordance with the present invention.

FIG. 6 is a schematic flow chart diagram illustrating an alternative embodiment of a method 600 for fly height detection using controlled excitation of the air bearing mode in accordance with the present invention. In one embodiment, the method 600 starts 602 and the control module 402 "spins up" 604 the disk. The control module 402 may be implemented in a glide certifier tester used in the manufacture of disk platters for hard disk drives. One example of a glide certifier tester suitable for use as a base system for implementing the present invention is the RQ-3000 Q-3000, supplied by Hitachi Electronics Engineering Co. of Brisbane, Calif.

The control module 402 then commands the actuator 208 to induce 606 a vibration in the glide head 202. As described earlier, the actuator 208 may be configured to increase the amplitude of the natural frequency of the glide head 202. Alternatively, the actuator 208 may induce a vibration having a specific predetermined frequency.

The calibration module 404 then calibrates 608 the vibration of the glide head and correlates the vibration to a specific drive level. This calibration determines the fly height.

Upon determining the fly height, the control module 402 commands the actuator 208 to increase 610 the vibration of the glide head 202. While the actuator 208 incrementally increases the vibration in the glide head, the vibration sensor 211 monitors 612 the suspension arm 204 for movement. A collision between the glide head 202 and an asperity 106 or irregularity in the disk surface will be transferred through the suspension arm 204 to the vibration sensor 211. As described above, the vibration sensor is configured to translate the mechanical energy of the collision into an electrical signal that may be communicated with the control module 402.

If a vibration is detected 614, the control module 402 commands the touchdown height detector 212 to measure the amplitude of the vibration in the glide head. In one embodiment, the touchdown height detector 212 measures the portion of the glide head 202 that moves the most. Using the "flapping" wing analogy of FIG. 3b, the touchdown height detector measures the amplitude of vibration at the "tip" of the wing. In a further embodiment, the control module 402 calculates the fly height margin as being ½ the amplitude of vibration of the glide head 202. This touchdown height measurement may be taken for each disk platter manufactured and then averaged for a specified batch of disk platters. The fly height margin determined from fly height and touchdown height measurements may be used in setting the fly height of the read/write transducers of a hard disk drive. In one embodiment, the fly height is equal to the touchdown height plus the fly height margin.

If no vibration is detected 614, the control module 402 commands the actuator 208 to increase the vibration of the glide head 202. The process of increasing the vibration in the glide head 202 is continued by the control module 402 until a collision occurs and a vibration is detected 614 by the vibration sensor 211. After recording 616 the fly height margin the method 600 ends 618.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for fly height detection using controlled excitation of air bearing mode, the apparatus comprising:
   an actuator coupled with a first end of a suspension arm and configured to induce oscillating vibrations in a glide head, the actuator further configured to continuously increase a peak to peak amplitude of the oscillating vibrations of the glide head until the glide head contacts at least one physical asperity;
   the glide head configured to detect physical asperities on a disk surface, the glide head coupled with a second end of the suspension arm; and
   a sensor module configured to communicate with a control module in response to the glide head coming in contact with the at least one physical asperity.

2. The apparatus of claim 1, further comprising a touchdown height detector configured to measure the amplitude of vibration of the glide head.

3. The apparatus of claim 2, wherein the touchdown height detector comprises a laser Doppler velocimeter.

4. The apparatus of claim 1, wherein the touchdown height detector comprises a laser Doppler vibrometer.

5. The apparatus of claim 1, wherein the sensor module is configured to control a vibration sensor.

6. The apparatus of claim 5, wherein the vibration sensor comprises a piezoelectric sensor configured to transmit an electrical signal to the sensor module in response to glide head contact with a physical asperity.

7. The apparatus of claim 1, wherein the actuator comprises an acoustic emission sensor.

8. The apparatus of claim 1, wherein the control module further comprises a calibration module configured to calibrate the vibration of the glide head, induce a vibration in the glide head, measure the vibration of the glide head, and correlate the vibration with a drive level.

9. A system for fly height detection using controlled excitation of air bearing mode, the system comprising:
   a disk configured to record data, the disk having a surface comprising physical asperities;
   a head gimbal assembly configured to calibrate a fly height margin for the disk, the head gimbal assembly comprising a glide head coupled to a suspension arm;
   an actuator coupled with a first end of the suspension arm and configured to induce oscillating vibrations in the glide head, the actuator further configured to continuously increase a peak to peak amplitude of the oscillating vibrations of the glide head until the glide head contacts at least one physical asperity;
   the glide head configured to detect physical asperities on the disk surface, the glide head coupled with a second end of the suspension arm; and
   a sensor module configured to communicate with a control module in response to the glide head coming in contact with the at least one physical asperity.

10. The system of claim 9, further comprising a touchdown height detector configured to measure the amplitude of vibration of the glide head.

11. The system of claim 10, wherein the touchdown height detector comprises a laser Doppler velocimeter.

12. The system of claim 10, wherein the touchdown height detector comprises a laser Doppler vibrometer.

13. The system of claim 9, wherein the sensor module is configured to control a vibration sensor.

14. The system of claim 13, wherein the vibration sensor comprises a piezoelectric sensor configured to transmit an electrical signal to the sensor module in response to glide head contact with a physical asperity.

15. The system of claim 9, wherein the actuator comprises an acoustic emission sensor.

16. The system of claim 9, wherein the control module further comprises a calibration module configured to calibrate the vibration of the glide head, induce a vibration in the glide head, measure the vibration of the glide head, and correlate the vibration with a drive level.

17. A computer program product comprising a computer useable medium having a computer readable program, wherein the computer readable program when executed on a computer causes the computer to:
   induce oscillating vibrations in a glide head, wherein an actuator coupled with a first end of a suspension arm is configured to induce the oscillating vibrations in the glide head and the glide head is coupled with a second end of the suspension arm;
   continuously increase a peak to peak amplitude of the oscillating vibrations of the glide head until the glide head contacts at least one physical asperity;
   detect physical asperities on a disk surface; and
   communicate with a control module in response to the glide head coming in contact with the at least one physical asperity.

18. The computer readable program of claim 17, wherein the computer readable program causes the computer to measure the amplitude of vibration of the glide head.

19. The computer readable program of claim 17, wherein the computer readable program causes the computer to control a vibration sensor.

20. The computer readable program of claim 17, wherein the computer readable program causes the computer to transmit an electrical signal to the sensor module in response to glide head contact with a physical asperity.

21. The computer readable program of claim 17, wherein the computer readable program causes the computer to calibrate the vibration of the glide head by inducing a vibration in the glide head, measuring the vibration of the glide head, and correlating the vibration with a drive level.

22. A method for fly height detection using controlled excitation of air bearing mode, the method comprising:
   inducing oscillating vibrations in a glide head, wherein an actuator coupled with a first end of a suspension arm is configured to induce the oscillating vibrations in the glide head and the glide head is coupled with a second end of the suspension arm;
   continuously increasing a peak to peak amplitude of the oscillating vibrations of the glide head until the glide head contacts at least one physical asperity; detecting physical asperities on a disk surface; and
   communicating with a control module in response to the glide head coming in contact with the at least one physical asperity.

23. The method of claim 22, wherein the method comprises measuring the amplitude of vibration of the glide head.

24. The method of claim 22, wherein the method comprises controlling a vibration sensor.

25. The method of claim 22, wherein the method comprises transmitting an electrical signal to the sensor module in response to glide head contact with a physical asperity.

26. The method of claim 22, wherein the method comprises calibrating the vibration of the glide head by inducing a vibration in the glide head, measuring the vibration of the glide head, and correlating the vibration with a drive level.

27. An apparatus for fly height detection using controlled excitation of air bearing mode, the apparatus comprising:
  means for inducing vibrations in a glide head, wherein an actuator coupled with a first end of a suspension arm is configured to induce the oscillating vibrations in the glide head and the glide head is coupled with a second end of the suspension arm;
  means for continuously increasing a peak to peak amplitude of the oscillating vibrations of the glide head until the glide head contacts at least one physical asperity;
  means for detecting physical asperities on a disk surface; and
  means for communicating with a control module in response to the glide head coming in contact with the at least one physical asperity.

* * * * *